(12) United States Patent
Challenger et al.

(10) Patent No.: US 6,266,742 B1
(45) Date of Patent: Jul. 24, 2001

(54) ALGORITHM FOR CACHE REPLACEMENT

(75) Inventors: James Robert Harold Challenger, Garrison; Arun Kwangil Iyengar, Yorktown Heights, both of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/958,506

(22) Filed: Oct. 27, 1997

(51) Int. Cl.$^7$ ................................................ G06F 12/08
(52) U.S. Cl. .................... 711/133; 711/136; 711/137; 711/143; 711/145
(58) Field of Search ................................. 711/137, 136, 711/145, 143, 119, 133

(56) References Cited

U.S. PATENT DOCUMENTS

| | | | | |
|---|---|---|---|---|
| 5,043,885 | * | 8/1991 | Robinson ............................ | 711/133 |
| 5,293,609 | * | 3/1994 | Shih et al. ........................... | 711/137 |
| 5,546,559 | * | 8/1996 | Kyushima et al. .................. | 711/133 |
| 5,555,393 | * | 9/1996 | Tanaka et al. ....................... | 711/133 |
| 5,594,885 | * | 1/1997 | Lautzenheiser ..................... | 711/133 |
| 5,619,676 | * | 4/1997 | Fukuda et al. ...................... | 711/137 |
| 5,706,467 | * | 1/1998 | Vishlitzky et al. ................. | 711/129 |
| 5,751,993 | * | 5/1998 | Ofek et al. .......................... | 711/136 |
| 5,778,442 | * | 7/1998 | Ezzat et al. .......................... | 711/159 |
| 5,822,759 | * | 10/1998 | Treynor .............................. | 711/134 |
| 5,829,023 | * | 10/1998 | Bishop ................................ | 711/118 |
| 5,893,139 | * | 4/1999 | Kamiyama .......................... | 711/117 |
| 5,943,687 | * | 8/1999 | Liedberg ............................ | 711/156 |
| 6,012,126 | * | 1/2000 | Aggarwal et al. ................. | 711/133 |
| 6,021,470 | * | 2/2000 | Frank et al. ......................... | 711/138 |

\* cited by examiner

*Primary Examiner*—Hiep T. Nguyen
(74) *Attorney, Agent, or Firm*—David M. Shofi; Anne VAchon Dougherty

(57) ABSTRACT

In a computer system in which caching is utilized for improving performance, a method for determining whether an uncached object should be cached, and, if so, which objects, if any, should be removed from a cache to make room for the new uncached object. The method assigns a metric correlated with the desirability of caching an object, considering parameters such as access frequencies, object sizes, object lifetimes and times to calculate and/or to fetch the object. The metric weights more recent accesses more heavily than less recent accesses. The method can be used for improving the performance of an algorithm which utilizes priority queues and can additionally be applied when attempting to predict the expected frequency of an occurrence based upon past occurrences.

79 Claims, 3 Drawing Sheets

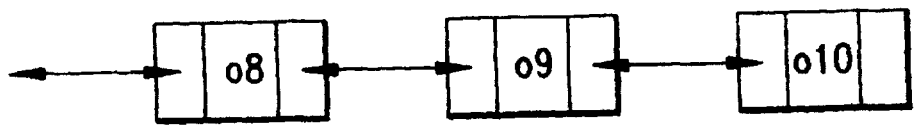
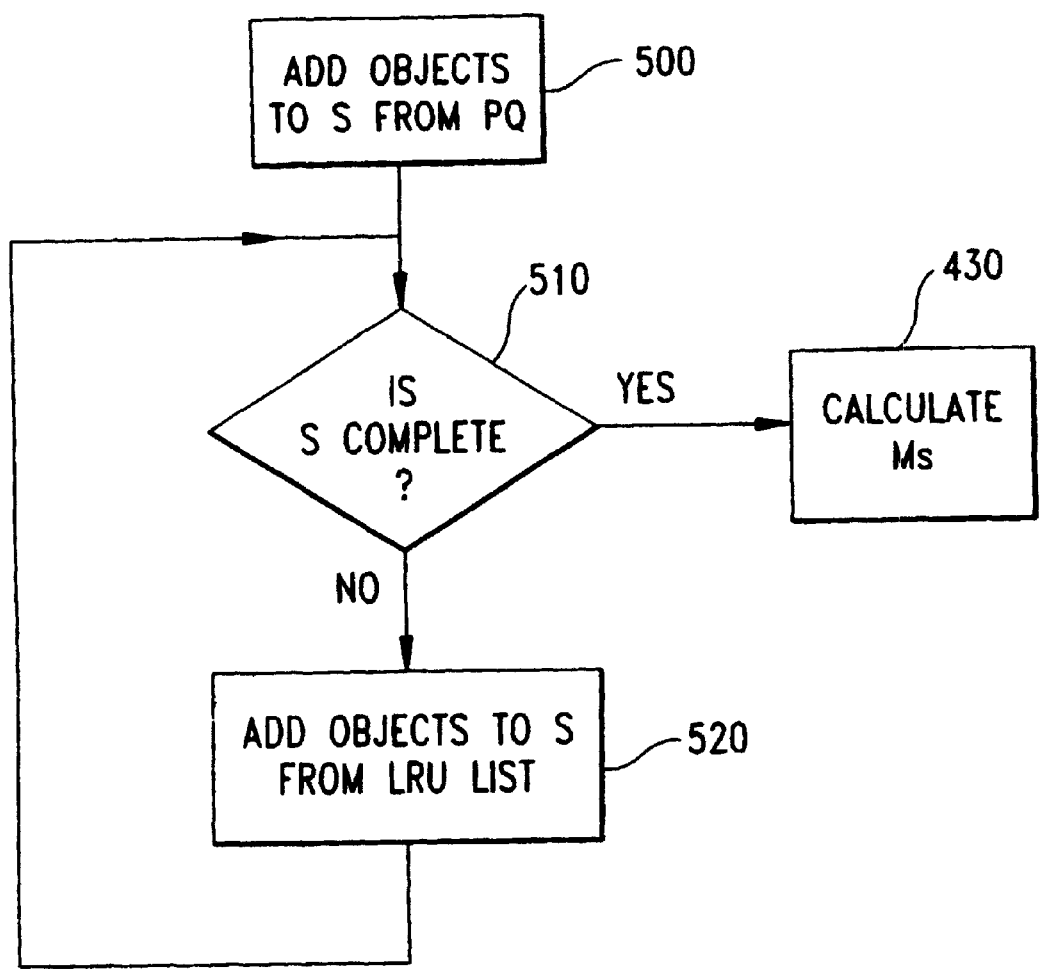

ALGORITHM FOR CACHE REPLACEMENT

CROSS REFERENCE TO RELATED APPLICATIONS

The present invention is related to U.S. patent application Ser. No. 741,412, issued as U.S. Pat. No. 6,012,126 filed Oct. 29, 1996, by Aggarwal et al., entitled "System and Method for Caching Objects of Non-Uniform Size". This co-pending patent application is commonly owned with the present invention.

BACKGROUND OF THE INVENTION

Caching is commonly used for improving computer performance when the system is frequently accessing objects which require significant time to fetch or create. By caching an object, the cost for fetching or creating the object is only incurred once. Subsequent requests for a cached object can then be satisfied from the cache, a process which incurs significantly less overhead than recalculating the object or fetching it from a remote location.

In many cases, caches are of finite size. Selectivity must be applied in determining which objects should be cached when the cache is full or almost full. The subject invention provides a method for determining which objects should be placed in a cache. It is particularly (but not exclusively) useful when multiple parameters affecting the desirability of caching objects vary for different objects. Such parameters include the frequency with which an object is accessed, object size, the time to calculate an object, or the time to fetch the object from a remote location, and the lifetime (i.e. time between updates) of an object.

Caching is particularly useful for improving performance in the World Wide Web. Several types of caching are currently being utilized to cache Web-retrieved objects which could make use of the present invention, including server caching, proxy caching and browser caching. Web server performance is often poor when the percentage of dynamic pages generated by the server is high (see "An Analysis of Web Server Performance" by A. Iyengar et. al., "Proceedings of GLOBECOM '97", November 1997). In order to improve performance, server caching of local dynamic data is utilized. In server caching, the server generating dynamic pages can cache dynamic pages so that they only have to be generated once (see "Improving Web Server Performance by Caching Dynamic Data", A. Iyengar and J. Challenger, "Proceedings of the Usenix Symposium on Internet Technologies and Systems", December 1997).

Another caching scheme is to have a proxy server cache documents from remote servers. Using proxy caching, the proxy server will be able to satisfy requests for documents without having to remotely fetch a document for each request (see "Caching Proxies: Limitations and Potentials" by M. Abrams et. al., "Fourth International World Wide Web Conference Proceedings", December 1996, pp. 119–133; and "World Wide Web Proxies" by A. Luotonen and K. Altis in "Computer Networks and ISDN Systems", vol. 27 (1994), pp. 147–154). Finally, browser caching is often used wherein web browsers cache recently requested documents and images both in main memory and on disk.

A number of cache replacement algorithms have been proposed in the literature (see "A Case for Delay-Conscious Caching of Web Documents", P. Scheuermann et. al., Sixth International World Wide Web Conference Proceedings, 1997; "Performance Engineering of the World Wide Web: Application to Dimensioning and Cache Design", J. Bolot and P. Hoschka, "World Wide Web Journal", Summer 1996, pp. 185–195; "Proxy Caching That Estimates Page Load Delays",R. P. Wooster and M. Abrams, "Sixth International World Wide Web Conference Proceedings", 1997; "Removal Policies in Network Caches for World-Wide Web Documents", S. Williams et. al., "Proceedings of SIG-COMM '96", pp. 293–305; "Intelligent Caching and Indexing Techniques for Relational Database Systems", T. Sellis, "Information Systems", vol. 13 no. 2, pp. 175–185, 1988.) Those set forth in the Bolot and Sellis references, utilize as parameters the time since an object was last referenced, the time to retrieve the item, the expected lifetime of the object, and the object size.

Commonly used methods for predicting the frequency with which an object is accessed include the time since the object was last accessed, in which the Least Recently Used (LRU) object is the candidate for replacement, and the LRU-K algorithm, discussed below. The time since the object was last accessed is one of the most common methods. It is of limited accuracy because it doesn't consider accesses before the most recent one. LRU-K, on the other hand, (see "The LRU-K Page Replacement Algorithm for Database Disk Buffering" by O'Neil et. al, in Proceedings of SIGMOD '93, pp. 297–306), estimates the time before the next access based on the time since the kth most recent access. LRU-K is equivalent to LRU when k=1. One drawback to LRU-K is that it weights the times between each of the last k references equally. A better strategy would be to assign more weight to more recent references. Another drawback to LRU-K is that the times of the last K references must be maintained for each object. The space overhead thus grows with K.

Some caching algorithms use a metric for the desirability of caching an object which is preferably proportional to the processing time which is saved by caching the object. Maintaining current values of the metric at all times as proposed in the prior art is, however, prohibitively expensive.

It is an objective of the present invention to provide a method for making caching decisions which balances the expense of caching with the benefits.

SUMMARY OF THE INVENTION

Under the present invention, the value of a metric a which is maintained for an object is allowed to be slightly out of date; and, in calculating a, more weight is assigned to more recent references. The m value for an object is typically updated whenever the object is requested, updated, or under certain other circumstances when the program handling cache replacement (which is known as the cache manager) accesses the object. A priority queue is used to order objects by estimated m values. The priority queue makes it easy to locate the object having the lowest estimated m value (i.e., by definition, the least desirable to cache). Since priority queues have a slight performance disadvantage in that access times grow logarithmically with the size of the priority queue, it is desirable to keep the priority queue as small as possible. To keep the priority queue small, the present method uses a supplemental data structure and a threshold value for a which determines the data structure on which an object should be placed. The result is that the time to locate objects to be replaced doesn't grow with the number of cached objects.

In accordance with the present invention, the method for bounding the size of priority queues can be applied to other situations where priority queues are needed, and not just to cache replacement. Furthermore, the present invention provides a new method for predicting the expected frequency with which objects are accessed. The invention estimates access frequencies based on several accesses in the past, with recent times between accesses being assigned more weight than more distant ones. Space requirements are small and do not grow with the number of past accesses considered.

In addition, the present invention provides a method for estimating the lifetimes of objects. The method can be applied to other situations outside the realm of caching where it is necessary to predict the likelihood of an event occurring based upon past behavior.

BRIEF DESCRIPTION OF THE DRAWINGS

The invention will now be described in detail with specific reference to the appended drawings wherein:

FIG. 3 depicts an example of an LRU list used in accordance with the present invention;

FIG. 5 depicts a block diagram of a method for determining a set of objects which could be invalidated from a cache to make room for a new object.

DETAILED DESCRIPTION OF THE PREFERRED EMBODIMENTS

Figure 1:
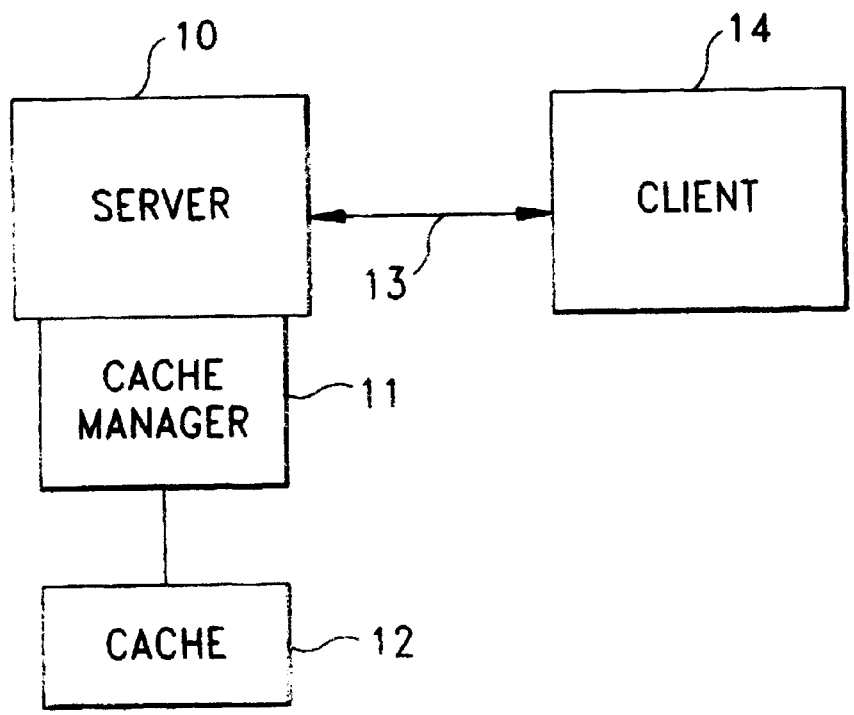
FIG. 1 depicts an example of a system having features of the present invention.

With reference to FIG. 1, in accordance with the present invention, a server 10 is communicating with one or more clients 14 over a network 13. The server 10 runs a program known as the cache manager 11. The cache manager 11 is a program which adds objects to caches, removes objects from caches, and uses the inventive method to determine which objects should be added to caches and which objects should be removed in order to make room for new objects. The cache manager maintains a priority queue, illustrated in FIG. 2 as containing objects o1 through o7, and the Least Recently Used list (hereinafter "LRU"), at least a portion of which, including objects o8–o10, is illustrated at FIG. 3. The server 10 uses the cache 12 to store objects, so that the cost for creating or fetching cached objects is only incurred once. Subsequent requests for a cached object will then be satisfied by the server with little overhead, resulting in quick response times to client requests. It will be apparent to one skilled in the art that the invention can be applied to a variety of other systems, such as systems with multiple servers or multiple caches, web-based or non-Web based systems (e.g., for database caching), and environments which are not client-server based. Not only can the invention be used for caching determinations but also wherever a determination must be made of priority and/or likelihood of an event occurring based upon past occurrences. Throughout this document, placing an object on a data structure should be hereinafter interpreted as placing an object on a data structure or as placing a pointer to the object on a data structure. Similarly, reference to parameters, such as object size, object lifetime, access frequency, time to calculate, time to fetch, etc., should be interpreted as reference to either the actual value or an estimated value thereof.

Figure 2:
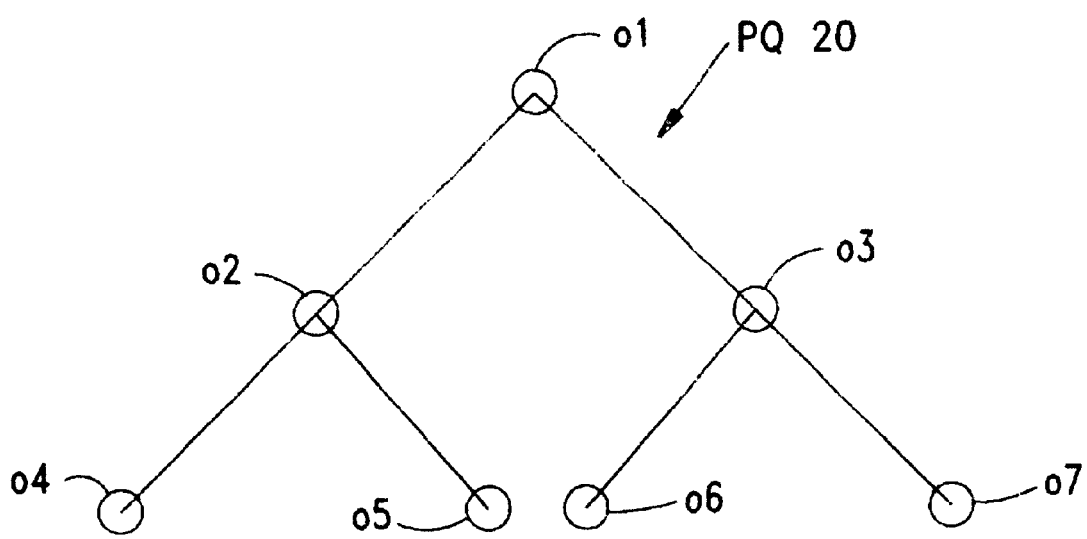
FIG. 2 depicts an example of a priority queue used in accordance with the present invention.

A quantitative metric m is used to assess the desirability of caching each object. The metric m is based on how frequently objects are accessed (estimated or actual frequency), the actual or estimated object sizes, the actual or estimated object lifetimes, and the actual or estimated time to calculate or to fetch objects. The metric m is positively correlated with the desirability of caching an object. A quantity mlow is used to determine whether a cached object should be placed on the priority queue PQ 20 (FIG. 2). PQ 20 is for objects with low values of m. Such objects are strong candidates for removal from the cache. The LRU (Least Recently Used) list 30 (FIG. 3) contains all cached objects or pointers to all cached objects and is ordered by the time at which the objects were last requested. Calculation of the values for m is detailed further below.

Initially, the priority queue PQ 20 of FIG. 2 is empty. Over time, the cache manager 11 will acquire the information relative to how the m values are distributed; and when the cache 12 is close to being full, the cache manager 11 will set low appropriately. From this point, any cached objects encountered by the cache manager which have a value of m not larger than mlow will be placed on PQ 20. The value slow is a dynamic quantity which can be adjusted (e.g., if PQ 20 becomes too big or too small). Objects will be removed from PQ 20 either if they are invalidated or if their a values are found to be greater than mlow (e.g. assuming that an access causes the m value to increase). Whenever an object o1, which is not already in the cache 12, becomes a candidate for caching and the cache contains insufficient space to store o1, the cache manager 11 must decide whether to cache o1 and, if so, which object(s) to remove from the cache to make room for o1. The cache manager 11 chooses a set of cached objects S whose removal from the cache 12 would make enough room for o1 to fit in the cache. S is chosen from the objects on PQ 20 with the lowest values of a. If PQ 20 contains an insufficient number of objects, the remaining members of S are chosen from the least recently used objects identified by the LRU list 30. If the average of m weighted by object size for all objects in S is greater than or equal to m for o1, then o1 is not cached. Otherwise, o1 is cached after invalidating all objects in S.

Figure 4:
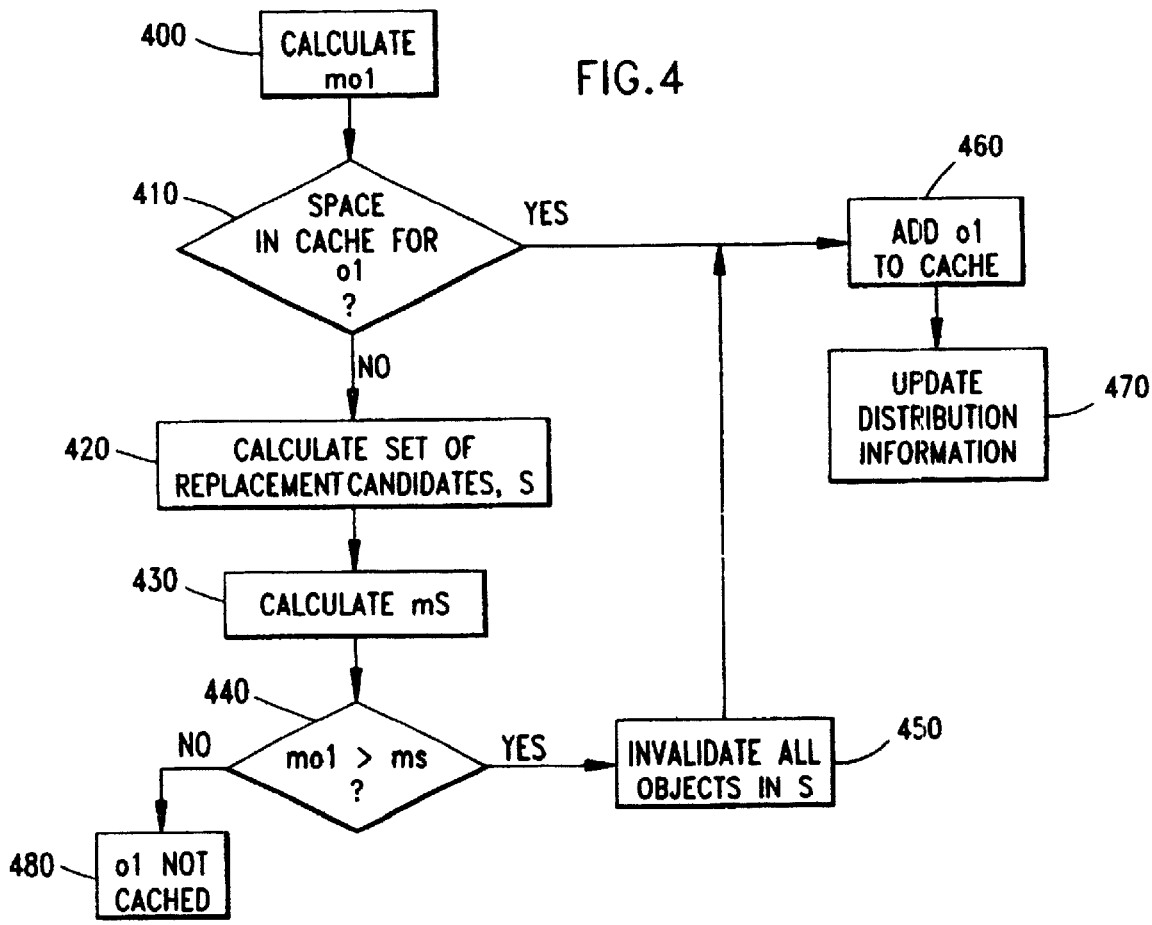
FIG. 4 depicts a block diagram of a method for determining whether an object should be added to a cache and if so, which objects if any should be invalidated.

FIG. 4 presents a block diagram of the process flow when an object o1 becomes a candidate for being added to a cache. The object o1 may become a candidate for caching after it is requested by a client 14 of FIG. 1. Alternatively, o1 could become a candidate for caching without being requested by a client 14, for example, if the cache manager 11 attempts to prefetch o1 before it is requested. Prefetching is frequently performed for objects with a high probability of being accessed. In step 400, the quantity mo1 which is the m value for o1 is calculated. In accordance with the invention, mo1 should be determined from one or more parameters including, but not limited to: the estimated frequencies with which o1 is accessed; the size of o1; the estimated lifetime of o1; and, the estimated time to calculate o1 anew.

The value mo1 is calculated using the formula:

$$mo1 = (t/a - t*p/u)/s$$

where a is the expected time between successive requests for o1, t is the expected time to fetch or calculate o1, u is the expected time between successive updates of o1, p is the probability that o1 will be accessed between successive updates to o1, and s is the size of o1.

The quantity a can be estimated in a number of ways. Prior art method for determining a value similar to a would base the value on the time since o1 was last accessed. This method has the drawback that accesses before the most recent one are not considered. Another method would be to determine the value from the time since the kth most recent access for some positive integer k. While more general than the previous method, this method weights all of the k most recent accesses equally, instead of giving higher weights to more recent accesses; and, the space requirements grow with k since it is necessary to keep track of the times of the k most recent references.

Figure 6:
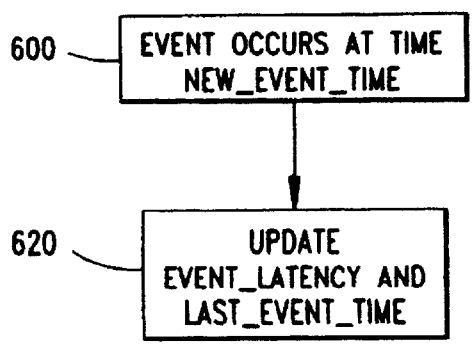
FIG. 6 depicts a block diagram of a method for updating the variables used in predicting event frequencies.

The preferred method takes into consideration as many previous accesses as desired, has constant space requirements regardless of the number of previous accesses taken into account, and weights recent accesses more heavily than less recent ones. The preferred embodiment uses a new algorithm for estimating how frequently events occur. The algorithm can be used for a wide variety of events and not just for determining cache replacement policies. The new method which is used for estimating both a and u, or more generally for estimating event frequencies, requires the system to maintain a variable event_latency which is the estimated time between events and last_event_time which is the time of the most recent event. After the system has obtained a reasonable estimate for event_latency and has determined a value for last_event_time, it can continuously update the value of these variables using the program logic depicted in FIG. 6.

In step 600, the system determines that an event has occurred at time new_event time. In step 620, event_latency is updated using the formula: new event_latency= ((new event_time−last_event_time)+(k−1) * old event_latency)/k for some weighting factor k. The value of k is allowed to change, as appropriate (e.g., if the distribution of event arrival times is not constant). The last_event_time is then set to new_event_time. In calculating a, events correspond to client requests for o1 and each new request for any object in the cache corresponds to a new time step. A variable total_accesses is used to count the total number of client requests for cached objects and serves as a clock for calculating event latencies. The time at which an event occurs is the value of total_accesses when the event (i.e., the request) occurs. The preferred method for determining the quantity u is to use the inventive algorithm for estimating event frequencies. The value u is estimated to be event_latency. In calculating u, events correspond to updates of o1. As in the calculation of a, each new request for any object in the cache corresponds to a new time step. The quantity p can be estimated using a number of techniques. The preferred method is to calculate p using the formula: $p=1-((a-1)/a)^u$.

Referring back to FIG. 4, it is determined in step 410 whether the cache contains enough free storage space to store o1. If the answer is "Yes", o1 is added to the cache in step 460. A pointer to o1 is added to the front (i. e. the end which corresponds to the most recently requested objects) of the LRU list 30. (A straight forward variation of this algorithm would be one in which o1 is added somewhere to the middle or at the end of an LRU list when prefetched into the cache). If mo1 is less than or equal to mlow, a pointer to o1 is added to PQ 20 which is a priority queue ordered by a values. A priority queue is a data structure which stores objects or pointers to objects which have a key associated with them. A priority queue allows the object with the lowest key to be identified quickly. Priority queues should support efficient lookup, insertion, and deletion. In the present embodiment, the keys are the a values. Priority queues used in the present embodiment have the further property (not required of all priority queues) that they allow objects to be identified in ascending order of a values starting from the object with the lowest a value. There are several methods in the prior art for implementing these types of priority queues. One well-known method is to use B+-trees (see "Dynamic Storage Allocation on a Multiprocessor" by A. Iyengar, MIT/LCS/TR-560, MIT Laboratory for Computer Science, PhD thesis, December 1992, "The Design and Analysis of Computer Algorithms" by Aho, Hopcroft, and Ullman, Addison-Wesley, 1974.) In step 470, the cache manager 11 optionally updates information which it may be maintaining on the distribution of a values, which may result in a change to the value of mlow.

If the answer determined in step 410 is "No", a set S of replacement candidates is identified in step 420. The set S contains cached objects with low m values whose removal from the cache 12 would leave sufficient room for o1 to be cached. Step 420 can be implemented in several ways. The preferred method is shown in FIG. 5 and will be described in detail below. In step 430, a quantity ms equal to the sum of all m values for objects in S weighted by objects sizes is determined. More specifically, current m values for each object in S are determined and multiplied by the size of the object. The resulting value, ms, is equal to the sum of all of these products divided by the sum of the sizes all objects in S.

In step 440, it is determined if mo1>ms. If the answer is "No", o1 is not added to the cache, see step 480. If the answer is "Yes", all objects in S are removed from the cache in step 450. This also requires removing pointers to all objects in S from the LRU list 30. Since the LRU list is doubly linked, each object in S can be removed from the LRU list 30 in constant time. Objects in S on PQ 20 are removed from PQ 20. Processing then proceeds to step 460 described in detail earlier.

FIG. 5 shows the preferred method for implementing step 420. This method finds a set S of cached objects with low m values which can be removed from the cache to make room for o1. In step 500, the cache manager 11 adds objects to S from PQ 20. The cache manager examines objects in PQ 20 by increasing estimated m values starting with the object with the lowest estimated m value. (A variation which one skilled in the art could easily implement is to recalculate the m value for one or more objects which are examined in this step. This may require modifying PQ 20 in order to keep PQ 20 properly ordered). This process continues until S is complete or all objects referenced on PQ 20 have been examined. S is considered to be complete if invalidation of all objects in S would leave sufficient space for o1 to be cached. Selectivity can be applied in adding objects to S. For example, in cases where it is necessary to free up a single contiguous block of storage for o1, the set of objects in S could be forced to be contiguous. In other situations, this might not be a necessity and any object from PQ could be added to S.

In step 510, it is determined if S is complete. This is true if invalidation of all objects in S would leave sufficient space for o1 to be cached. There are several ways in which step 510 could be implemented. For example, if o1 had to be stored in a contiguous block of storage, the criterion might be whether the removal of all objects in S would leave a contiguous block large enough for o1. In other situations, the criterion might be whether the sum of the size of all objects in S plus the amount of unused space in the cache is greater than or equal to the size of o1. If the answer produced by step 510 is "Yes", processing continues to step 430 described earlier. If the answer produced by 510 is "No", processing continues to step 520. In step 520, objects are added to S from the LRU list 30 until S is complete. The LRU list is examined starting at the back (i.e. starting from the least recently accessed object and progressing to more recently accessed objects). Selectivity may optionally be used in adding objects to S from the LRU list 30 just as in step 500. After S is complete, processing continues with step 430 described earlier. The size of PQ 20 can be adjusted by varying the value of mlow dynamically. It is to be noted that the value of mlow can be dynamically varied for other reasons, as well. If PQ becomes too large, the objects with the highest estimated m values can be removed. If PQ 20 becomes too small, cached objects with low m values not already on PQ 20 can be added to PQ. These objects can be located by examining the LRU list 30 starting at the back (i.e. the end corresponding to the least recently accessed objects).

Whenever a cached object is requested by a client 14, a pointer to the object is moved to the front of the LRU list 30. The current m value for the object is determined. This m value is used to determine whether the object needs to be removed from PQ 20 if the object is on PQ (or even whether to add the object to PQ if it is not already on PQ.). There are a number of variations on this algorithm which could be implemented by one skilled in the art. A limit could be placed on the size for cacheable objects. The cache manager 11 would then never attempt to cache an object larger than a certain size. Another variation could be to specify another parameter, mverylow. The cache manager 11 would never attempt to cache an object with an m value less than or equal to mverylow. Yet another variation is that certain objects could be allowed to remain on the LRU list 30 after they are invalidated from the cache. If such an object o1 were subsequently prefetched into the cache, its position on the LRU list would then be accurate.

The invention has been described with reference to several specific embodiments. One having skill in the relevant art will recognize that modifications may be made without departing from the spirit and scope of the invention as set forth in the appended claims.

Having thus described our invention, what we claim as new and desire to secure by Letters Patent is:

1. In a system containing a set of objects and wherein each object has an object value associated with it, said system adapted to provide a priority queue and at least one data structure, a method for identifying an object with a low object value comprising the steps of:
   determining a threshold value;
   comparing the object value to said threshold value for at least one object;
   placing one or more objects for which the object value is greater than said threshold value on a data structure; and
   placing one or more objects for which the object value is not greater than said threshold value on said priority queue;
   identifying one or more objects in the system having low object values by examining at least one of said priority queue and said data structure; and
   ordering said objects on said priority queue based on said object value.

2. The method of claim 1 further comprising associating a second value, correlated to said object value, to each of said objects and at least partially ordering said objects on said data structure based on said second values.

3. The method of claim 1 wherein said priority queue is adapted to allow objects to be identified in ascending order of object values starting from the object with the lowest object value.

4. The method of claim 3 wherein said priority queue is implemented using one or more B-+ trees.

5. The method of claim 1 wherein the number of objects in the system may be changed.

6. The method of claim 1 further comprising varying said threshold value.

7. The method of claim 1 wherein said system comprises a cache and the object value associated with an object correlates to the desirability of caching the object.

8. The method of claim 2 wherein said system comprises a cache and the object value and said second value associated with an object correlate to the desirability of caching the object.

9. The method of claim 2 wherein said second value associated with an object is correlated with the frequency with which said object is accessed.

10. The method of claim 9 wherein said data structure comprises a list ordered by how recently said objects have been accessed.

11. The method of claim 10 wherein said second value associated with an object is determined by the position of said object on said list.

12. The method of claim 1 further comprising the step of deleting an object from at least one of said priority queue and said data structure.

13. The method of claim 2 in which said identifying step further comprises examining all objects on said priority queue and examining at least one of said objects on said data structure with a low second value.

14. In a system having at least one cache manager managing one or more caches including a priority cache for ordering objects by caching value, in which at least one cache contains at least one cached object having an object caching value, a method for determining priority of objects in at least one of said one or more caches which contain an object comprising the steps of:
   periodically calculating one or more caching values; and
   comparing one or more caching values to at least one object caching value of the at least one cached object.

15. The method of claim 14 in which said caching value is calculated using at least one parameter selected from the group consisting of the frequency with which the object is accessed, the size of the object, the lifetime of the object, and the expected time to fetch or create the object.

16. The method of claim 15 wherein said comparing comprises comparing the caching value of one or more cached objects to the caching value of at least one uncached object.

17. The method of claim 15 wherein said calculating is done upon occurrence of a trigger event.

18. The method of claim 17 wherein said trigger event is when an object is requested.

19. The method of claim 17 wherein said trigger event is when an object is updated.

20. The method of claim 17 wherein said trigger event is when an object is accessed by the cache manager.

21. The method of claim 15 wherein overhead for calculating said caching value for an object is controlled by varying the frequency with which said caching value for said object is determined.

22. The method of claim 15 in which said caching value is based on the estimated savings in system time by caching said object.

23. The method of claim 15 in which said caching value is calculated using at least one parameter selected from the group consisting of the frequency with which the object is accessed, the size of the object, the lifetime of the object, and the expected time to fetch or create the object if the object is not cached.

24. The method of claim 14 further comprising establishing a threshold caching value based upon said plurality of caching values.

25. The method of claim 24, in which an auxiliary value correlated with said caching value is associated with each object, further comprising:
maintaining an auxiliary data structure at least partially ordered by said auxiliary value; and
placing one or more objects for which said caching values exceeds said threshold value on said auxiliary data structure.

26. The method of claim 24 further comprising determining if an object is to be placed on a priority queue comprising calculating a new object caching value for said object and comparing said calculated caching value to said threshold caching value.

27. The method of claim 26 further comprising placing said object on said priority queue if said new object caching value is not greater than said threshold caching value.

28. The method of claim 24 further comprising changing said threshold caching value.

29. The method of claim 14 further comprising determining if an uncached object is to be cached comprising calculating a new object caching value for said uncached object and identifying at least one cached object for removal from said cache.

30. The method of claim 29 wherein said identifying comprises identifying a set of cached objects having low caching values whose removal from said cache would make room for said new object.

31. The method of claim 30 further comprising obtaining an average caching value for said set and comparing said average caching value to said new object caching value.

32. The method of claim 31 in which said average caching value is weighted by the sizes of objects in said set.

33. The method of claim 30 further comprising maintaining information regarding accesses to said objects and including in said set those objects which are least recently accessed.

34. The method of claim 31 further comprising caching said new object only if said new object caching value exceeds said average caching value.

35. The method of claim 23 wherein said calculating of said caching value for at least one object comprises applying the formula: $(t/a-t*p/u)/s$, where a is the expected time between successive requests for the object, t is the expected time to fetch or create the object, u is the expected time between successive updates of the object, p is the probability that the object will be accessed between successive updates to the object, and s is the expected object size.

36. The method of claim 35 wherein p is determined using a quantity correlated with $1-((a-1)/a)^u$.

37. The method of claim 35 wherein a is calculated based upon object accesses.

38. The method of claim 35 wherein u is calculated based upon object updates.

39. The method of claim 37 wherein a is calculated by a method comprising the steps of:
maintaining a variable event_latency representing an estimate of the expected time between successive accesses;
maintaining a variable last_event_time representing the time of a previous access;
after occurrence of a new access, at time new_event_time, updating event_latency using the formula: new event_latency=((new_event_time-last_event_time)+(k-1)*old event_latency)/k for a weighting factor k.

40. The method of claim 38 wherein u is calculated by a method comprising the steps of:
maintaining a variable event_latency representing an estimate of the expected time between successive updates;
maintaining a variable last_event_time representing the time of a previous update;
after occurrence of a new update, at time new_event_time, updating event_latency using the formula: new event_latency=((new_event_time_last_event_time)+(k-1)*old event_latency)/k for a weighting factor k.

41. A method for estimating how frequently events occur comprising the steps of:
maintaining a variable event_latency representing an estimate of the expected time between successive events;
maintaining a variable last_event_time representing the time of a previous event;
after occurrence of a new event, at time new_event_time, updating event_latency using the formula: new event_latency=((new_event_time-last_event_time)+(k-1)*old event_latency)/k for a weighting factor k.

42. The method of claim 41 in which the system further comprises one or more computers and said events correspond to object accesses.

43. The method of claim 41 in which the system further comprises one or more computers and said events correspond to object updates.

44. A method for calculating a caching value for an object comprising the steps of:
determining the expected time, a, between successive requests for the object;
determining the expected time, t, to fetch or create the object;
determining the expected time, u, between successive updates of the object;
determining the probability, p, that the object will be accessed between successive updates to the object;
determining the expected object size, s; and
applying the formula $(t/a-t*p/u)/s$.

45. The method of claim 44 wherein p is determined using a quantity correlated with $1-((a-1)/a)^u$.

46. The method of claim 44 wherein a is calculated based upon object accesses.

47. The method of claim 44 wherein u is calculated based upon object updates.

48. A system containing a set of objects comprising:
storage means;
at least one priority queue;
at least one data structure;
means for calculating a caching value for each object by applying the formula: $(t/a-t*p/u)/s$, where a is the expected time between successive requests for the object, t is the expected time to fetch or create the object, u is the expected time between successive updates of the object, p is the probability that the object will be accessed between successive updates to the object, and s is the expected object size; and
means for determining treatment of said object based on said caching value.

49. A system containing a set of objects comprising:
storage means;
at least one priority queue adapted to allow objects to be identified in ascending order of object caching values starting from the object with the lowest object caching value;
at least one data structure;
means for calculating an object caching value for each object; and
means for determining treatment of said object based on said object caching value.

50. The system of claim 49 wherein said means for determining treatment of said object based on said object caching value comprises:
threshold means for determining a threshold value;
a comparison component for comparing the object caching value to said threshold value for at least one object; and
wherein said system places one or more objects for which the object caching value is greater than said threshold value on the data structure and places one or more objects for which the object caching value is not greater than said threshold value on the priority queue.

51. The system of claim 50 further comprising means for identifying one or more objects in the system having low object caching values by examining at least one of said priority queue and said data structure.

52. The system of claim 49 wherein said priority queue is implemented using one or more B-+ trees.

53. The system of claim 49 wherein said data structure comprises a list ordered by how recently said objects have been accessed.

54. A system for estimating how frequently events occur comprising:
a variable event_latency representing an estimate of the expected time between successive events;
a variable last_event_time representing the time of a previous event;
processing component for, after occurrence of a new event, at time new_event_time, updating event_latency using the formula: new event_latency=((new_event_time-last_event_time)+(k-1)*old event_latency)/k for a weighting factor k.

55. In a system having at least one cache managers managing one or more caches in which at least one cache contains at least one cached object having an object caching value, a method for determining priority of objects in at least one of said one or more caches which contain an object comprising the steps of:
periodically calculating one or more caching values; and
comparing one or more caching values to at least one object caching value of the at least one cached object.

56. The method of claim 55 wherein said comparing comprises comparing the caching value of one or more cached objects to the caching value of at least one uncached object.

57. The method of claim 55 wherein said calculating is done upon occurrence of a trigger event.

58. The method of claim 57 wherein said trigger event is when an object is requested.

59. The method of claim 57 wherein said trigger event is when an object is updated.

60. The method of claim 57 wherein said trigger event is when an object is accessed by a cache manager.

61. The method of claim 55 wherein overhead for calculating said caching value for an object is controlled by varying the frequency with which said caching value for said object is determined.

62. The method of claim 55 in which said caching value is based on the estimated savings in system time by caching said object.

63. The method of claim 55 in which said caching value is calculated using at least one parameter selected from the group consisting of the frequency with which the object is accessed, the size of the object, the lifetime of the object, and the expected time to calculate the object anew.

64. The method of claim 55 further comprising establishing a threshold caching value based upon said plurality of caching values.

65. The method of claim 64, in which an auxiliary value correlated with said caching value is associated with each object, further comprising:
maintaining an auxiliary data structure at least partially ordered by said auxiliary value; and
placing one or more objects for which said caching values exceeds said threshold value on said auxiliary data structure.

66. The method of claim 64 further comprising changing said threshold caching value.

67. The method of claim 64 further comprising determining if an uncached object is to be cached comprising calculating a new object caching value for said uncached object and identifying at least one cached object for removal from said cache.

68. The method of claim 67 wherein said identifying comprises identifying a set of cached objects having low caching values whose removal from said cache would make room for said new object.

69. The method of claim 68 further comprising obtaining an average caching value for said set and comparing said average caching value to said new object caching value.

70. The method of claim 69 in which said average caching value is weighted by the sizes of objects in said set.

71. The method of claim 68 further comprising maintaining information regarding accesses to said objects and including in said set those objects which are least recently accessed.

72. The method of claim 69 further comprising caching said new object only if said new object caching value exceeds said average caching value.

73. The method of claim 63 wherein said calculating of said caching value for at least one object comprises applying the formula: $(t/a - t*p/u)/s$, where a is the expected time between successive requests for the objects t is the expected time to fetch or create the object, u is the expected time between successive updates of the object, p is the probability that the object will be accessed between successive updates to the object, and s is the expected object size.

74. The method of claim 73 wherein p is determined using a quantity correlated with $1-((a-1)/a)^u$.

75. The method of claim 73 wherein a is calculated based upon object accesses.

76. The method of claim 73 wherein u is calculated based upon object updates.

77. The method of claim 75 wherein a is calculated by a method comprising the steps of:
maintaining a variable event_latency representing an estimate of the expected time between successive accesses;
maintaining a variable last_event_time representing the time of a previous access;
after occurrence of a new access, at time new_event_time, updating event_latency using the formula: new event_latency=((new_event_time−last_event_time)+(k−1)*old event_latency)/k for a weighting factor k.

78. The method of claim 76 wherein u is calculated by a method comprising the steps of:
maintaining a variable event_latency representing an estimate of the expected time between successive updates;
maintaining a variable last_event_time representing the time of a previous update;
after occurrence of a new update, at time new_event_time, updating event_latency using the formula: new event_latency=((new_event_time−last_event_time)+(k−1)*old event_latency)/k for a weighting factor k.

79. A program storage device readable by a machine, tangibly embodying a program of instructions executable by the machine, to perform method steps for any of claims 1–2, 3–23, 24–47 and 15–78.

* * * * *